Figure 1:
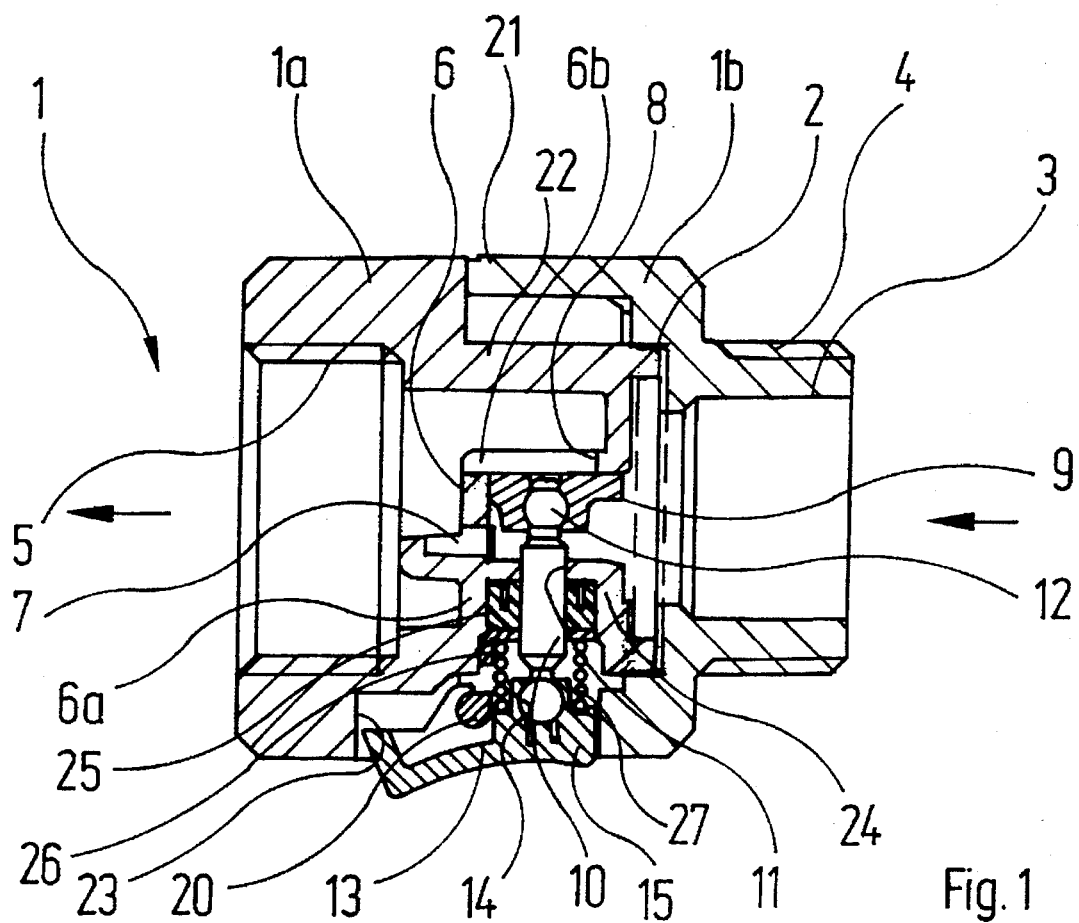

United States Patent [19]
Huber

[11] Patent Number: 5,653,260
[45] Date of Patent: Aug. 5, 1997

[54] FLOW-RATE LIMITING VALVE FOR INSERTING BETWEEN A SHOWER HOSE AND A HAND SHOWER

[76] Inventor: Roland Huber, Eichhofstr.9 CH -, 5604 Henschiken, Switzerland

[21] Appl. No.: 612,558

[22] Filed: Mar. 8, 1996

[30] Foreign Application Priority Data

Mar. 10, 1995 [DE] Germany .................. 195 08 631.7

[51] Int. Cl.$^6$ .................................................. F16K 11/044
[52] U.S. Cl. ........................... 137/625.33; 137/625.3
[58] Field of Search ............................ 137/625.3, 625.33

[56] References Cited

U.S. PATENT DOCUMENTS 5,038,827  8/1991  Heffner et al. .............. 137/625.33 X

*Primary Examiner*—John C. Fox
*Attorney, Agent, or Firm*—Lowe, Price, LeBlanc & Becker

[57] ABSTRACT

The housing (1) of a flow restricting valve has a first connection (3) which acts as a connection to a shower hose, and also a second connection (5) via which the valve can be connected to a hand shower. There are provided inside the housing 1 and parallel to each other, two outlet openings 7, 8 which determine the rate of flow per unit of time. One (7) of these outlet openings has a smaller cross-section than the other (8). The outlet opening (8) with the larger cross-section is normally sealed by a valve disk (9) so that the water can only flow through the smaller outlet opening (7) at a smaller power output per liter. If, once in a while, a greater power output per liter is required from the shower, then the valve plate can be removed from the outlet opening (8) with the larger cross-section by means of a manual actuator (15) and moved into a second position in which it at least considerably throttles or completely seals the flow path to the outlet opening (7) with the smaller cross-section. Owing to the difference in pressure of the water acting on it, the valve disk (9) remains in this position, in which a greater power output per liter flows to the shower, until the water is shut off at the shower control and the valve disk (9) returns once again to its original position under the action of a spring (26).

4 Claims, 1 Drawing Sheet

FLOW-RATE LIMITING VALVE FOR INSERTING BETWEEN A SHOWER HOSE AND A HAND SHOWER

The invention concerns a flow restricting valve for insertion between a shower hose and a hand shower, comprising a) a housing, which has a first connection to connect it to the shower hose and a second connection to connect it to the hand shower;

b) a moving valve component fitted inside the housing which, by virtue of its position, determines the volume of water flowing through it;

c) a manual actuating mechanism, by which the position of the valve component can be altered.

The known form of this type of valve is a shut-off valve, at which the user can temporarily shut off the shower in order to soap himself, without having to reach the shower control which is located further away in order to do so. Both opening and closing are carried out manually. By means of this valve, a certain water saving can be achieved in as much as, during the soaping process, the flow of water through the shower would be shut off more often than without such a valve; this known type of valve does not, however, have any effect on the volume of water which normally flows through the shower.

Another known type of valve is one which is built into the hand shower and has two stable positions: in one of these positions, the water flowing through the shower is throttled more intensively than in the other position. Owing to the fact that in this design the valve is built into the shower, it is comparatively expensive and the valve cannot be retrofitted. Primarily, however, it does not give the lower volume of water any priority, with the result that the water saving effect which this produces is only limited.

The task of this invention is to design a flow restricting valve of the type named at the beginning such that in normal operation a water saving is possible without the intervention of the user, even though the full power output per liter is available if required, and it should be possible to retrofit the valve to existing showers.

This problem is solved according to the invention in that d) a first outlet opening with a relatively small cross-section and a second outlet opening with a relatively large cross-section are located parallel to each other in the water channel going through the housing;

e) the valve component is a valve disk which can adopt two stable positions, namely ea) a first position in which it seals or considerably throttles the path of the water to the second outlet opening with the larger cross-section and frees the path of water to the first outlet opening with the smaller cross-section;

eb) a second position in which it frees the path of water to the second outlet opening with the larger cross-section;

f) a spring mechanism is provided which tries to move the valve disk into the first position.

According to the invention, therefore, the flow restricting valve is connected in the same way as the known shut-off valves, between shower hose and hand shower which means that it can basically be retrofitted to existing shower systems. By virtue of the design details described in the main claim, the valve is designed so that water normally flows through the smaller outlet opening with a power output per liter which is less than the maximum possible power output per liter. This power output per liter is selected so that it is perfectly adequate for standard showers. Only in special cases in which the user once in a while requires a greater power output per liter from the shower, can he intervene and, with the aid of the actuating mechanism, change over the valve disk so that the larger outlet opening is now freed and therefore allows a greater volume of water per unit of time to flow to the shower through the valve. The resulting water pressure keeps the valve disk in this position even after the manual actuating mechanism has been released. When the showering process is finally completed and the flow of water is shut off at the shower control, then the valve disk automatically returns to the "normal position" in which only the smaller cross-section outlet opening is freed. Owing to the precedence given to the mode of operation with the smaller power output per liter, which makes it necessary for the user to intervene to achieve greater power outputs per liter, considerable water savings can be achieved, particularly in the public utilities.

In an advantageous embodiment of the invention, there is provided inside the housing a dividing wall which has a radial section and an axis parallel section and one of the two outlet openings is provided respectively in each of the sections. By virtue of this configuration, the form of the internal division of the housing is simple and injection moulding is easy.

In a particularly preferred embodiment of the invention of this type, the larger cross-section outlet opening is provided in the axis parallel section of the dividing wall and the manual actuating mechanism consists of an actuating shaft which, at the end located inside the housing, is connected to the valve disk and is taken radially out of the housing. The actuator of the manual actuating mechanism can thus easily be reached and its location in the surface of the housing is visually acceptable.

Finally, it is expedient if the manual actuating mechanism consists of a rocker-type actuator. This can be easily integrated into the surface of the valve and is simple to operate.

One design example of the invention is explained in greater detail by means of the drawings.

Figure 2:
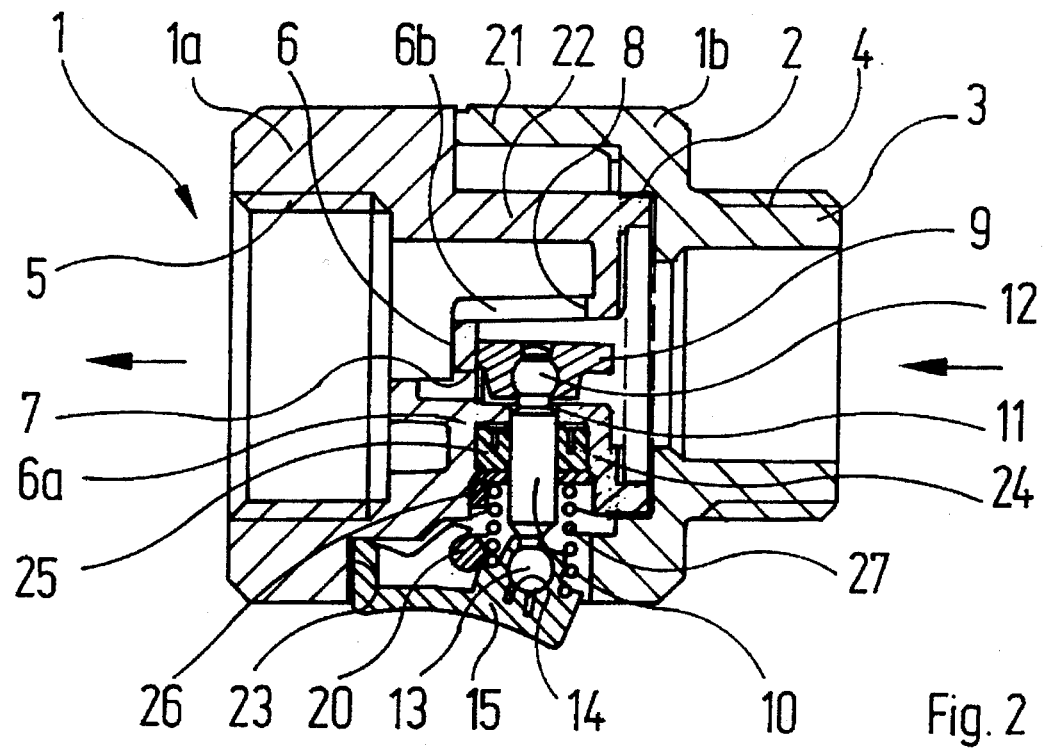

FIG. 1: shows an axial section through a flow restricting valve;

FIG. 2: shows an axial section, similar to that of FIG. 2 [sic], but with the valve disk inside the valve in another position.

FIG. 1 shows an axial section through a valve which is placed between the end of a shower hose and a hand shower which is normally connected directly to the shower hose and is used to restrict the volume of water flowing to the hand shower to a normal rate, but which can be increased by manual actuation to a greater rate. The valve illustrated consists of a housing 1 which is made up of two parts 1*a* and 1*b*. The two parts 1*a* and 1*b* are seal welded together at the points identified by the reference number 2; for functional purposes, they can therefore be regarded as one unit.

A connecting fitting 3 is preformed on to the right-hand part of the housing 1*b* as shown in FIG. 1 which has the same configuration as the conventional connecting fittings used in hand showers. The connecting fitting 3 has an outer thread 4 to which a shower hose can be attached.

In the left-hand part of the housing 1*a* as shown in FIG. 1, and coaxial to the connecting fitting, there is made a tapped hole 5 by means of which the housing part 1*a* can be screwed on to the connecting fitting of a hand shower, which, for the above-mentioned reasons, is therefore also complementary to the outer thread 4 on the connecting fitting 3 of the right hand housing part 1*b*.

The left-hand housing part 1a is provided with an angular dividing wall 6, which has a section 6a which runs essentially radial to the housing 1 and a section 6b which runs essentially axis parallel to it. An outlet opening 7 which has a comparatively small cross-section is made through the radial section 6a of the dividing wall 6; an outlet opening 8 which has a relatively large cross-section is made in the axis parallel section 6b of the dividing wall 6. The flow through the valve illustrated, from the connecting fitting 3 to the connection hole 5 through the two outlet openings 7 and 8 in the dividing wall 6 is controlled by a valve disk 9. FIG. 1 shows this valve disk 9 lying on the outlet opening 8 in the section 6b of the dividing wall 6 such that this opening is sealed and only the outlet opening 7 in the section 6a of the dividing wall 6 is clear.

With the aid of an actuating mechanism, the valve disk 9 can be removed from the dividing wall 6 so that the outlet opening 8 in the section 6b of the dividing wall is freed. In this second position, as shown in FIG. 2, the valve disk 9 does not need to provide a tight seal for the outlet opening 7 in section 6a of the dividing wall.

The actuating mechanism for the valve disk 9 consists of an actuating shaft 10 which goes through a radial opening 11 in the wall of the left-hand part of the housing 1a. The inside end of the actuating shaft 10 has the form of a sphere 12 which is engaged form-fit into the flexible material of the valve disk.

The outside end of the actuating shaft 11 is also a sphere 13, which snaps into a corresponding receptacle 14 on a rocker-type actuator 15. The latter is coupled, by means of a pivot pin 20, to an apron 21 on the right-hand part of the housing 1b which goes round, with clearance, an area 22 of the left-hand part of the housing 1a which tapers in diameter. The rocker-type actuator 15 is mostly located inside an opening 23 in the apron 21 so that only a small section protrudes above the outer contour of the housing 1.

There is housed in a cup-shaped recess 24 in the outer wall of the left-hand part of the housing 1a which goes coaxially round the actuating shaft 10, a shaped seal 25 which seals the actuating shaft 10 against the housing 1. Acting between a shim 26 which rests on the outside of the shaped seal 25 and the rocker-type actuator 15 is a return spring 27 which tries to move the valve disk 9 on to the outlet opening 8. In the embodiment illustrated, this return spring 27 is a tension spring. A compression spring can also be used instead, but this would then have to be fitted to the opposite side of the pivot pin 20 between the rocker-type actuator 15 and the housing part 1b.

The valve described operates as follows:

It should be assumed that the housing 1 is connected to a shower hose by means of the connecting fitting 3 and to a hand shower by means of the tapped hole 5. The valve disk 9 is normally located in the position shown in FIG. 1, in which water is only free to flow through the outlet opening 7 with the comparatively small cross-section. This means that by virtue of the throttle effect of the opening 7, only a limited volume of water per unit of time can flow through the valve. If the shower user decides that the normal water volume is insufficient for a specific purpose, for example in order to create a massage effect with the water jets emerging from the shower, then he uses the rocker-type actuator 15 to change the valve disk 9 over into the position shown in FIG. 2. The water can now (first of all) flow through the outlet opening 8 through the dividing wall 6. Since this outlet opening 8 has a very much larger cross-section, the throttle effect produced is very much smaller than that of the outlet opening 7. The volume of water flowing through the valve per unit of time is therefore very much greater than shown in FIG. 1. The working surface for the water pressure on the back of the valve disk 9 around the cross-sectional area of the actuating shaft 10 is smaller than on the front facing the outlet opening 8. The pressure difference resulting from this is enough to keep the valve disk 9 against the force of the return spring 26 in the position shown in FIG. 2. In other words: the water flows at a greater volume even when the user releases the rocker-type actuator.

If the shower user then shuts off the water at the shower control which is connected upstream of the shower hose and which is really used to adjust the volume and where appropriate the temperature of the water flowing to the shower, then there is no longer any pressure difference of the water acting on the valve disk 9. By the action of the return spring 26, the rocker-type actuator 15, the actuating shaft 10 and thus the valve disk 9 return once more to the normal position shown in FIG. 1. If the shower is turned on again, then the water first flows once more at its "normal volume".

I claim:

1. Flow restricting valve for insertion between a shower hose and a hand shower, comprising a) housing which has a first connection to connect it to the shower hose and a second connection to connect it to the hand shower;

b) a moving valve component fitted inside the housing, which, by its position, determines the volume of water flowing through it;

c) a manual actuating mechanism, by means of which the position of the valve component can be changed, characterized in that d) there is located in the water channel through the housing (1) and parallel to each other a first outlet opening (7) with a relatively small cross-section and a second outlet opening (8) with a relatively large cross-section;

e) the valve component is a valve disk (9) which can adopt two stable positions, namely ea) a first position in which it seals, or considerably throttles, the water channel to the second outlet opening (8) with the relatively large cross-section and frees the water channel to the second outlet opening (7) with the relatively small cross-section;

eb) a second position in which it frees the water channel to the second outlet opening (8) with the relatively large cross-section;

f) a spring mechanism (26) is fitted which tries to push the valve disk (9) into the first position.

2. Valve according to claim 1, characterized in that there is fitted inside the housing (1) a dividing wall (6) which has a radial section (6a) and an axis parallel section (6b) and one of the two outlet openings (7, 8) is provided respectively in each of the sections (6a, 6b).

3. Valve according to claim 3, characterized in that the large diameter outlet opening (8) is provided in the axis-parallel section (6b) of the dividing wall (6) and that the manual actuating mechanism consists of an actuating shaft (10), which is connected at the end located inside the housing (1) to the valve disk (9) and is taken out of the housing (1) in the radial direction.

4. Valve according to claim 1, characterized in that the manual actuating mechanism consists of a rocker-type actuator (15).

* * * * *